May 25, 1937. W. J. D. VAN DIJCK 2,081,719
SOLVENT EXTRACTION PROCESS
Filed May 5, 1933

Inventor: Willem J.D. van Dijck
By his Attorney

Patented May 25, 1937

2,081,719

UNITED STATES PATENT OFFICE 2,081,719

SOLVENT EXTRACTION PROCESS

Willem J. D. van Dijck, The Hague, Netherlands, assignor to Shell Development Company, San Francisco, Calif., a corporation of Delaware Application May 5, 1933, Serial No. 669,580
In the Netherlands May 11, 1932

24 Claims. (Cl. 87—28)

The process relates to separating a liquid mixture into its components or groups of components A and B.

It is known to extract certain components from liquids by extraction with a solvent. Such extraction may be carried out continuously or discontinuously, either in counter-current or not. Moreover, each of the extractions may be repeated several times. The object of the extraction, i. e. the manufacture in a pure state of the two components or groups of components into which the mixture has to be separated by extraction with so-called selective solvents, cannot be effected with the aid of known extracting agents or methods in which only one solvent is used. In applying the known methods the most favourable results are obtained by treating the liquid mixture to be separated with a sufficiently selective solvent in counter-current. Although with such an extracting agent the least soluble component or group of components can be obtained in the above manner in any desired degree of purity, the extract will always contain both components.

It is an object of this invention to provide a method of extraction whereby a mixture of two components or group of components A and B can be extracted by means of a preferential solvent for A, so as either to produce both A and B at any desired degree of purity, or in addition to producing B of any desired purity at the same time to concentrate A in the extract to the highest degree which the A-B-solvent system makes possible to attain at the particular temperature employed in the process.

This may be effected by washing the extract phase obtained by the extraction, with a liquid which partly or substantially consists of A, which liquid may be a part of the extract phase from which the extracting agent has been entirely or substantially removed and which has been obtained before or after the washing. This liquid for brevity's sake may also be termed "backwash".

Figure 3:
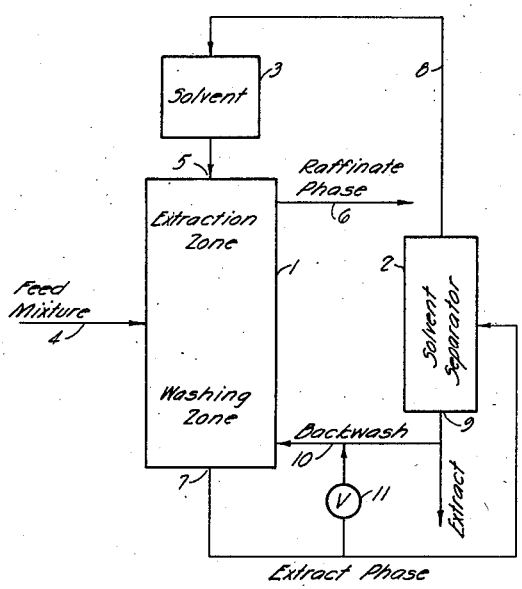

One form of apparatus suitable for carrying out this process is illustrated in Figure 3, which shows an extraction apparatus 1, a solvent separator or fractionator 2, and solvent storage tank 3, all interconnected with pipes and provided with valves, pumps, heat exchangers and other adjuncts, not shown. The extraction apparatus 1 is shown to be a column, which may contain suitable contact means, provided with an inlet 4 at the approximate mid-section through which the liquid mixture or solution is introduced. A selective solvent is introduced into the column 1 through an inlet 5. Under extracting conditions prevailing in the extraction column two phases are formed, the raffinate or solvent-poor phase is withdrawn at 6, and the extract or solvent-rich phase is withdrawn at 7. The latter is conducted to a separator 2, from which the solvent is returned to the tank 3 through a conduit 8, and the extract is discharged through outlet 9. A portion of this extract is returned to the extraction column 1 through conduit 10 at a point near the point of discharge 7. If it is not desired to introduce pure extract as a backwash, the extract may be mixed with extract phase by opening valve 11.

The backwash may also be produced from the extract phase after the latter has been more highly concentrated by further treatment under the same or more intensive conditions, such as cooling to lower temperatures or washing with a second solvent or a mixture of solvents, etc. Since such treatments often result in a reduction of the solvent content in the extract phase, it is not always necessary to further remove the solvent from the concentrated extract phase. It is to be understood, therefore, that my extract phase may be subjected to any one of a large number of treatments, and that my process is not limited to the situation in which the removal of the solvent is the only treatment to which the extract phase is subjected.

It should be noted that although I have represented the extraction means as a single tower, my backwash may be used in connection with a multi-stage treater, such as a series of counter-current treaters, or a series of mixers and phase separators. In this case, a series of treaters would constitute an extraction zone wherein a feed mixture is extracted with the selective solvent and another series of treaters would form a washing zone, wherein the extract phase from the first zone is washed with the backwash; the two zones may be connected in series. In the multi-stage treater the backwash may be introduced into several of the stages of the washing series or only into the last stage as desired. The backwash may, therefore, be the product of a stage which is other than the one in which it is used.

For the complete removal of the component or group of components A dissolved in the mixture it is essential that at the working temperature both components A and B are only partially miscible with the solvent used. It is to be understood that when A is a group of substances, this group, as such, must be only partially miscible with the solvent, but some of the substances may be totally miscible with the solvent.

It is true that the process may be carried out also with an extracting agent which at the range of temperature under review is completely miscible with one of the components or groups of components, but this will be done only if no high degree of purity of the components is required, it being in that case impossible to obtain the extract in any desired degree of purity.

Figures 1, 2:
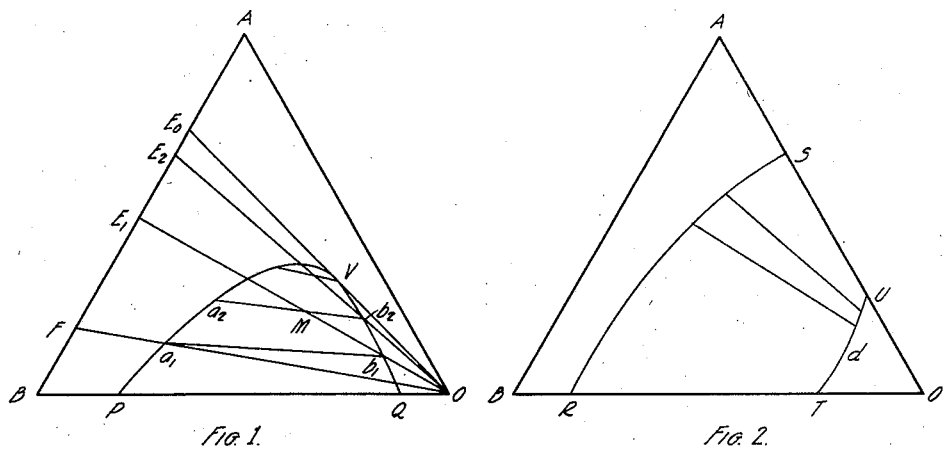

To illustrate this point a reference may be had to Fig. 1 of the drawing, representing a three-component phase diagram for a system: components A and B, and a solvent O at a certain temperature. This diagram indicates that the component A is miscible in all proportions with either B or O, but B and O are only partially miscible at this particular temperature. If, now, a solution of the composition F is extracted with the solvent O by a continuous countercurrent method, for example, it becomes possible to obtain at one end of the extraction apparatus a raffinate phase approaching that of the composition P, i. e. consisting substantially of B and O, with A being removed from this phase to any desired degree. By removing the solvent O from the ultimate raffinate phase a raffinate consisting substantially of B may be obtained. The extract phase produced by this method can be represented by $b_1$ and upon removal of the solvent O would yield an extract of the composition $E_1$. It is seen from the diagram, that a solution of the composition V (V is the point of tangency of $OE_0$ and the curve PVQ) is capable of yielding an A+B solution having the composition $E_0$, which is richer in the component A than the solution $E_1$. It is also evident that $E_0$ represents the best extract, i. e. an extract with the highest concentration of $A_1$, which it is possible to obtain by extraction of A+B solutions with the solvent O at this particular temperature regardless of the method employed.

As has been already stated, the present invention provides a method of extraction for obtaining an improved extract, i. e. one which is richer in the component A than the extract obtainable by already known methods; it now becomes possible to obtain the best possible extract, such as $E_0$, without resorting, unless it may be especially desired, to other solvents than O or to lower temperatures.

Applying my invention to the illustrative case, wherein an extract phase $b_1$ is withdrawn from an extraction apparatus and the extract $E_1$ is obtained therefrom by removing the solvent, I return a portion of the extract $E_1$ to the extraction process and mix it with the extract phase $b_1$, whereby a mixture M may be produced, consisting of the phases $a_2$ and $b_2$. The raffinate phase is allowed to remain in the extraction process and flow towards the point of introduction of the feed into the process. The new extract phase $b_2$ is withdrawn from the process and the solvent O is removed therefrom, thus yielding an improved extract $E_2$, a portion of which is now returned to the extraction process instead of $E_1$, is mixed with the extract phase $b_2$, formed in the process, yielding a still better extracted phase nearer to V than $b_2$. In this manner, by continually returning a portion of the extract to the process, so that it is effectively contacted with the extract phase produced by an extraction of F with the solvent O, the ultimate extract phase obtained by this process can be improved, made to correspond to the best possible extract, such as V, and its desired composition maintained by regulating the quantity of the returned portion of the extract, which portion has been termed a "backwash". It is not essential that the backwash be entirely solvent-free, as any solution or mixture within the area of $Fa_1b_1b_2VE_0$, for example, which, upon being contacted with $b_1$, would yield a mixture having a composition within the area of partial miscibility $a_1b_1b_2Va_2$, can be effectively used as a backwash.

Figure 2 of the drawing represents solubility characteristics of A and B, and a solvent O at a temperature at which both A and B are only partially miscible with O. It can be seen now from this diagram that by combining the backwashing process with an extraction process it is possible to produce both the raffinate and extract phases approaching the compositions R and U, respectively, within any desired degree, and that any A+B solution can be separated by extraction and backwashing at this temperature with the solvent O into substantially pure components A and B, so that, ultimately, the backwash in this case will consist of substantially pure A.

Identical results may be obtained if at the temperature at which the backwashing is effected the axis AO is a tangent to the binodal curve.

From the foregoing description it follows that it is immaterial what type of a continuous or intermittent extraction process is combined with my backwashing process. Both or either of the processes may be continuous or of a batch-type and may be carried out in a series of stages (mixers and separators) or in one or more extraction columns, and at the same or different temperatures. Normally, as it was described, the backwash is obtained from the extract phase obtained in the process by removing therefrom by distillation, or by other suitable methods, all or a part of the solvent; it is within the spirit of the invention to use as a backwash an A+B solution, or A+B+O solution, or a mixture obtained independently of the backwashing process. The principal characteristic of a backwash is that its solvent-free portion contains less B than the solvent-free portion of the raffinate phase which is in an equilibrium with the solution to be backwashed.

Moreover, the invention is independent of the method whereby an A+B+O solution of the character of an extract phase, which is to be backwashed, such as $b_1$ (Fig. 1) or $d$ (Fig. 2), is obtained; any such solution can be subjected to a backwashing treatment by contacting it with the backwash, as defined hereinbefore, whereby a new and improved extract phase is produced together with a raffinate phase. In carrying out the backwashing process in conjunction with an extraction process, wherein an A+B solution is extracted with a solvent O, I prefer to combine the just mentioned raffinate phase produced by backwashing with the said A+B solution before the latter is subjected to an extraction with O.

A more specific form of the combination extraction-backwashing process may consist of the two steps carried in such a manner that the raffinate phase leaving the backwashing zone and entering the extraction zone approaches as near as possible the raffinate phase which is in the equilibrium with the extract phase leaving the extraction zone. For example, referring to Fig. 1, and assuming that the solvent O is heavier than the feed F, i. e. extract phases $b_1$, $b_2$, etc. have greater specific gravities than the corresponding raffinate phases $a_1$, $a_2$, etc., the process of this invention may be carried in an extraction column which consists of an extraction zone, i. e. upper portion, and a backwashing zone, i. e. the lower portion of the column. Let the solvent O be admitted at the top of the column, the feed at the bottom of the extraction zone, which in this case is the top of the backwashing zone. The backwash, e. g. a portion of the extract obtained by entirely or partly removing the solvent from the ultimate extract phase withdrawn at the bottom of the column, is introduced near the bottom of the column. A raffinate phase is withdrawn at the top of the column. Flows of liquids through the column are continuous. Then, by regulating the relative quantities of the solvent, the feed and the backwash (the first two may be maintained constant, if desired) the composition of the extract phase corresponding to V may be attained, as already described. Flows of various liquids in and out of the column and lengths of the two parts of the column may now be so adjusted as to cause the composition of the solvent-free portion of the raffinate phase near the feed level to be F (the raffinate phase becoming $a_1$), in which case the process will be operated with the greatest efficiency for the given operating temperature and the degree of separation of A+B solution into its components. The same holds true for the systems represented by Fig. 2.

While, strictly speaking, complex mixtures, like mineral oils, cannot be treated in discussions or in practical applications of extraction processes as two-component solutions, they nevertheless respond to the extraction-backwashing treatment, as described, so that a sharper separation between the components in the raffinates and the extracts can be obtained by the method of this invention than it is possible to realize by other known methods, and any of these may be improved by combining them with the backwashing process. As a further analogy between the complex and two-component solutions, the greatest efficiency in extracting the former is realized when the composition of the solvent-free portion of the raffinate phase leaving the backwashing zone (it can be termed a secondary raffinate phase) approaches as nearly as possible the composition of the feed; it should be realized, that in case of complex mixtures the two compositions can never be identical.

Another embodiment of the process according to the invention consists in that the washing of the extract phase obtained by the extraction, is effected in counter-current with the washing liquid consisting entirely or substantially of A.

In the process according to the invention the extraction of the original liquid mixture may also be effected in counter-current.

Finally that embodiment of the process according to the invention is recommendable in which the extraction of the original liquid mixture as well as the washing is effected in counter-current.

It may often be of advantage to effect the removal of the solvent O from the extract for the production of the backwash in such a way that the latter is given a composition corresponding to a point of the binodal curve of the triangular diagram.

Further the process is not restricted to atmospheric pressure, since in order to reach the most favourable temperature it may be necessary to apply raised pressure. Or, when the solvent recovery is carried out under a reduced pressure, this may be extended to include the extraction-backwashing system.

It is clear that also mixtures of solid substances may be split up by the present process in so far as they may be brought into a liquid state by a suitable solvent.

It will be evident that in any of the processes described the different liquids in question may have different gravities. The raffinate phase may have a lower specific gravity than the extract phase and the solvent may be heavier than the extract phase.

However, the gravity relations may be different for other components and solvents, so that the solvent used may be lighter than either the raffinate or the extract phase.

The described methods of extraction may be carried out either in a unitary apparatus, such as a column, or in a series of stages, which may be interconnected for a continuous countercurrent extraction, a number of such stages corresponding to the extraction zone of a single column and others constituting the backwashing section. However, the operation of the new process is not limited to the countercurrent flow of the mixture to be extracted with respect to the solvent (in the extraction zone) and of the backwash with respect to the extract phase from the extraction zone (in the backwash zone), but may be carried out by passing said liquid streams concurrently to each other, or crosscurrently. By the term "crosscurrent" are designated such extraction processes in which, for example, an oil is extracted in a series of consecutive stages with a fresh or different solvent in each stage, or an extract phase is backwashed in a series of consecutive stages with a fresh backwash in each or some of the stages; for example, an extract phase withdrawn from an extraction zone may be contacted with a quantity of backwash and the mixture allowed to settle, the separated new extract phase may be withdrawn and contacted with a new quantity of the backwash, forming a mixture from which a new extract phase separates out, etc.

Any of these steps may then be carried out at different temperatures and pressures.

Though the process is suitable for treating any liquid mixture of two components or two groups of substances which behave in a different way towards the extraction agent used, by way of example it may be remarked that it is very successfully applied to various petroleum distillates such as lubricating oils.

Also essential oils such as citronella oil may be split up into its constituents such as alcohols e. g. geraniol or aldehydes (citronellal).

All kinds of extraction agents may be used, such as the organic solvents whose molecules contain one of the following groups: $-NO_2$, $-CN$, $-SCN$, $=CO$, $-CH_2OH$, $=CHOH$, $\equiv COH$, $\equiv C-Cl$, and $-NH_2$.

Examples of some single solvents which are suitable for extracting oils are: Nitrobenzene, benzonitrile, monochloracetonitrile, phenyl thiocyanate, phenolthiocyanate, formate of pyridine, benzaldehyde, acetone, furfuryl alcohol, chlorisopropyl alcohol, diacetone alcohol, chlorpyridine, chlorex, chloraniline, sulfur dioxide, quinoline, isoquinoline, etc. My invention is not, however, limited to the use of the specific solvents enumerated, nor to solvents containing the enumerated chemical radicals, but may be used with any selective solvent.

The term "backwash" as used in the specification and claims is intended to designate a liquid (preferably produced from the extract phase which is withdrawn from the same extraction system wherein the backwash is used) which upon being brought into contact with the extract phase in the extraction zone, will change the concentration of its constituents in a manner to produce an extract phase of more desirable composition. Referring to Figures 1 and 2, this backwash may consist either entirely of component "A", or may consist of a solution of "A" in "B", or in "O", or in a mixture of "B" and "O", and must be capable, upon being contacted with an extract phase of "A—B—O" composition from the extraction zone, of producing an extract phase whose extract portion has a higher content of the component "A" than the solvent-free portion of the said "A—B—O" composition. It is necessary, as is evident from the foregoing explanation of the process that composition of an effective backwash must be such that the ratio of the concentration of component "A" to the concentration of "B" is greater in the backwash than in the feed mixture.

In the simplest case, the backwash consists of extract phase from which all or a portion of its solvent content has been removed. It may, however, be produced from the extract phase after it has been further treated with the same or other selective solvents.

It should be noted that by the term "component" is designated either of the two portions of any liquid mixture, which portions in relation to the extraction agents used differ in their chemical or physical properties and can be either separated from or concentrated into each other by extraction with a solvent. It will be evident that by the word "component" is meant, not only one chemically pure substance but that this word covers also a mixture of substances. A component, e. g. A, is said to be pure if it does not contain any portion of a substance which should be present only in the other component (B). In the present specification and claims there is no difference in meaning between the words "solution", "liquid mixture" and "liquid solution".

What I claim is:

1. In the process of extracting a liquid solution of two components with a liquid selective solvent, capable of separating said solution into two portions of different properties, wherein liquid raffinate and extract phases are formed, the steps of recovering a backwash liquor by a treatment comprising the operation of reducing the solvent concentration in a quantity of an extract phase produced in the process and then contacting a different quantity of the extract phase formed in the process with a portion of the recovered backwash liquor to form new raffinate and extract phases.

2. The process for extracting a liquid solution of two components by means of a liquid selective solvent capable of separating said solution into two portions of different properties, the steps comprising bringing said solution into contact with the solvent, thereby forming a heterogeneous mixture of liquid raffinate and extract phases, separating said phases by gravity, recovering by distillation an extract from a quantity of the separated extract phase and contacting the recovered extract with another quantity of the extract phase formed in the process to form two liquid phases.

3. The process for concentrating each of two liquid miscible components A and B, from their solution by continuous extraction with a non-miscible liquid solvent having a preferential solubility for component A, which comprises countercurrently treating the solution with the solvent, thereby producing liquid primary raffinate and primary extract phases, substantially separating said phases, withdrawing the raffinate phase from the process, mixing the primary extract phase with a stream of a backwash, said backwash being a liquid containing component A in a concentration which is higher than the concentration of component A in the said solution, and being a portion of the secondary extract phase, substantially described, thereby producing a liquid secondary raffinate phase and a liquid secondary extract phase, the latter containing an extract richer in component A than the extract of the first mentioned extract phase, and separating the two secondary phases from each other.

4. In the process of extracting a liquid solution of components A and B, with a liquid selective solvent having a preferential solubility for component A by means of a vertical column, the steps which comprise: continuously introducing the solution at the approximate mid-section of the column, continuously introducing said solvent near one end thereof and continuously treating said solution therewith, thereby maintaining two liquid countercurrent streams of raffinate and extract phases within the column, collecting the raffinate phase at the portion of the column near the entrance of the solvent and continuously withdrawing this phase from the column, collecting the extract phase at the opposite end of the column, withdrawing it therefrom and introducing a stream of a backwash, near the latter end of the column, said backwash being a liquid containing component A in a concentration which is higher than the concentration of component A in the said solution, and being a portion of the extract produced from the extract phase withdrawn from the extraction process.

5. The process of claim 4, wherein the composition of the feed substantially corresponds to that of the solvent-free portion of the raffinate phase at the level of introduction of the feed into the column.

6. In a process of extracting a liquid solution of two components with a liquid selective solvent, one of said components being preferentially soluble in said solvent, wherein liquid raffinate and extract phases are formed, the step of extracting the said extract phase with a liquid containing the preferentially soluble component in a concentration which is higher than the concentration of said component in the said solution and capable, when connected with the said solution under the conditions of the process, of forming two liquid phases.

7. In a process of extracting a liquid solution of two components with a selective solvent, one of said components being preferentially soluble in said solvent, wherein liquid raffinate and extract phases are formed, the step of extracting a quantity of the said extract phase with a backwash formed by treating another quantity of the final extract phase produced by the process in a manner to reduce its solvent content, thereby producing new liquid raffinate and extract phases, and then extracting the new raffinate phase with a liquid selective solvent capable of separating the new raffinate phase into two portions of different properties.

8. The process of claim 7, wherein the new raffinate phase is brought in contact with the liquid solution being extracted and the resulting mixture is extracted with the liquid selective solvent capable of separating the resulting mixture into two portions of different properties.

9. The process of claim 7, wherein by regulating the extraction of the extract phase with the backwash, the composition of the solvent-free portion of the new raffinate phase is made substantially to correspond to the composition of the solution being extracted.

10. The process of claim 7, wherein by regulating the extraction of the extract phase with the backwash, the composition of the solvent-free portion of the new raffinate phase is made substantially to correspond to the composition of the solution being extracted the new raffinate phase is brought in contact with the liquid solution being extracted and the resulting mixture is extracted with the liquid selective solvent capable of separating the resulting mixture into two portions of different properties.

11. In a process of extracting a liquid solution of two components with a liquid selective solvent in which one of said components is preferentially soluble, wherein liquid raffinate and extract phases are formed, the step of extracting a quantity of the said extract phase with a backwash by a countercurrent method, said backwash being formed by treating another quantity of the final extract phase produced by the process in a manner to reduce its solvent content.

12. In a process of extracting a liquid solution of two components with a liquid selective solvent in which one of said components is preferentially soluble, wherein liquid raffinate and extract phases are formed, the step of extracting a quantity of the said extract phase with a backwash by a countercurrent method, said backwash being formed by treating another quantity of the final extract phase produced by the process in a manner to reduce its solvent content, thereby producing new liquid raffinate and extract phases, and then extracting the new raffinate phase with a liquid selective solvent capable of separating the new raffinate phase into two portions of different properties.

13. The process of claim 12, wherein by regulating the extraction of the extract phase with the backwash the composition of the solvent-free portion of the new raffinate phase is made substantially to correspond to the composition of the solution being extracted.

14. A process of separating a liquid solution of two components with a liquid selective solvent comprising extracting the said solution with the said solvent by a countercurrent method, whereby liquid raffinate and extract phases are produced, and then extracting the said extract phase with a backwash, said backwash being a liquid containing the preferentially soluble component in a concentration which is higher than the concentration of said component in the said solution and capable, when connected with the said solution under the conditions of the process, of forming two liquid phases, thereby producing new liquid raffinate and extract phases.

15. The process of claim 14, followed by extracting the new raffinate phase with a liquid selective solvent capable of separating the new raffinate into two portions of different properties.

16. The process of claim 14, wherein by regulating the extraction of the extract phase with a backwash the composition of the solvent-free portion of the new raffinate phase is made substantially to correspond to the composition of the solution being extracted, followed by extracting the said new raffinate phase with a liquid selective solvent capable of separating the new raffinate into two portions of different properties.

17. The process of claim 14, wherein the extract phase is extracted with the backwash by a countercurrent method.

18. The process of claim 14, wherein the extract phase is extracted with the backwash by a countercurrent method, followed by extracting the new liquid raffinate phase with a liquid selective solvent capable of separating the new raffinate into two portions of different properties.

19. The process of claim 14, wherein the extract phase is extracted with the backwash by a countercurrent method, thereby producing a new liquid raffinate phase, whose solvent-free portion substantially corresponds in its composition to the solution being extracted, followed by extracting the new raffinate phase with a liquid selective solvent capable of separating the new raffinate into two portions of different properties.

20. In the process of extracting a liquid mixture containing more than two substances, the steps of contacting said liquid mixture with a selective solvent capable of separating said mixture into two portions containing said substances in different concentrations than they occur in the original mixture, under extraction conditions causing the formation of liquid extract and raffinate phases, and extracting said extract phase with a liquid containing the substance preferentially dissolved in the extract phase in a concentration which is higher than the concentration of said substance in the said extract phase under conditions to form two new liquid phases and separating the said new phases from each other.

21. In the process for extracting a liquid mixture containing more than two substances, the steps of contacting said liquid mixture with a selective solvent capable of forming liquid raffinate and extract phase containing said substances in different concentrations than they occur in the original mixture, under extracting conditions, recovering a backwash liquor by a treatment comprising the operation of reducing the solvent concentration in a quantity of an extract phase produced in the process, and then contacting a different quantity of the extract phase produced in the process with a portion of the recovered backwash liquor to form new liquid raffinate and extract phases.

22. In the process of extracting a liquid hydrocarbon oil, the steps of contacting said oil with a selective solvent capable of forming liquid raffinate and extract phases containing raffinate and extract oils, respectively, under extracting conditions, and extracting the said extract phase with a liquid containing oil of substantially the same composition as said extract oil in a concentration which is higher than the concentration of the extract oil in said petroleum oil to form two new phases.

23. In a process of extracting a liquid hydrocarbon oil, the steps of bringing together said oil and a selective solvent capable of separating said oil into two portions of different properties, under extracting conditions causing the formation of liquid raffinate and extract phases, separating said phases, forming a backwash liquor by a treatment comprising the operation of removing at least a portion of the selective solvent from a quantity of an extract phase formed in the process, and contacting a portion of the resulting backwash liquor with a different quantity of the extract phase formed in the process to form new liquid raffinate and extract phases.

24. In the process of extracting a liquid hydrocarbon oil, the steps of continuously introducing said oil into an intermediate point in a counter current extraction apparatus, continuously introducing near one end of said extraction apparatus, a selective solvent capable of separating said oil into two portions having different properties under extraction conditions, thereby maintaining two liquid countercurrent streams of raffinate and extract phases within the apparatus, withdrawing the raffinate phase from the apparatus at a point near the end at which the selective solvent is introduced and withdrawing the extract phase near the opposite end of the apparatus, concentrating the extracted oil contained in at least a portion of the withdrawn extract phase to produce a backwash liquor containing the extracted oil in a higher concentration than its concentration in the said extract phase, and continuously introducing said backwash liquor into the extraction apparatus near the end opposite to the point of introduction of the selective solvent.

WILLEM J. D. van DIJCK.